(12) United States Patent
Funk et al.

(10) Patent No.: US 8,271,334 B1
(45) Date of Patent: Sep. 18, 2012

(54) GENERATING A MEDIA CONTENT AVAILABILITY NOTIFICATION

(75) Inventors: Gregory Allan Funk, San Francisco, CA (US); Vincent Dureau, Palo Alto, CA (US); Rich Bragg, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/253,794

(22) Filed: Oct. 5, 2011

(51) Int. Cl.
*H04N 7/025* (2006.01)
*G06F 3/00* (2006.01)
*G00F 17/60* (2006.01)
(52) U.S. Cl. .............. 705/14.73; 705/14.11; 725/34
(58) Field of Classification Search ........... 705/14; 725/34, 39, 101, 25; 707/713; 709/202, 709/203
See application file for complete search history.

(56) References Cited

U.S. PATENT DOCUMENTS

| | | | |
|---|---|---|---|
| 7,769,775 B2 | 8/2010 | Yuen | |
| 7,991,764 B2 * | 8/2011 | Rathod | 707/713 |
| 2005/0071323 A1 | 3/2005 | Gabriel et al. | |
| 2005/0119936 A1 * | 6/2005 | Buchanan et al. | 705/14 |
| 2006/0036674 A1 * | 2/2006 | Walden et al. | 709/203 |
| 2006/0173985 A1 | 8/2006 | Moore | |
| 2006/0218226 A1 * | 9/2006 | Johnson et al. | 709/202 |
| 2007/0073593 A1 | 3/2007 | Perry et al. | |
| 2007/0208688 A1 | 9/2007 | Bandhole et al. | |
| 2007/0214485 A1 * | 9/2007 | Bodin et al. | 725/101 |
| 2008/0295131 A1 * | 11/2008 | Grover et al. | 725/39 |
| 2009/0113472 A1 * | 4/2009 | Sheth et al. | 725/34 |
| 2009/0293081 A1 * | 11/2009 | Pirani et al. | 725/25 |
| 2010/0153448 A1 | 6/2010 | Harpur et al. | |
| 2011/0296456 A1 * | 12/2011 | Pandala | 725/34 |

* cited by examiner

*Primary Examiner* — John Weiss
*Assistant Examiner* — Marilyn G Macasiano
(74) *Attorney, Agent, or Firm* — Foley & Lardner LLP

(57) ABSTRACT

Systems and methods for bookmarking media content for future availability are described. The method includes receiving a receiving a request for media content and user account data for a plurality of unique online content sources. The method also includes requesting content availability data from the plurality of unique online content sources and using received content availability data to generate a notification. Pricing information, the media format, and notification preferences may be used to further configure the searches and notifications.

20 Claims, 5 Drawing Sheets

GENERATING A MEDIA CONTENT AVAILABILITY NOTIFICATION

BACKGROUND

The present disclosure relates generally to determining if media content is available from different content sources. The present disclosure more specifically relates to notifying a user when the availability of the media content changes.

In today's digital age, media content such as movies, video clips, television shows, music, etc., is becoming available from an ever-increasing number of different content sources. For example, the same movie may be shown in a movie theater, broadcast on television, released on physical media (e.g., DVD, Blu-Ray VHS, etc.), made available to certain entities (e.g., institutions, hospitals, airlines, etc.), or placed on an online source for download or streaming. The timing of when media content is available from the different content sources can also differ. For example, a movie may only be shown in a movie theater for a limited period of time, followed by a period of time in which it is available via on-demand television or online streaming, before being released for download or on a physical media format. This increase in the number of different content sources, combined with the increase in disparate release schedules for media content, often leads to confusion among consumers.

SUMMARY

Implementations of the systems and methods for bookmarking media content for future availability are described herein. One implementation is a method for generating a media content availability notification. The method includes receiving, at a processing circuit, a selection of media content and content delivery preferences. The content delivery preferences include a selection of a plurality of unique online content sources and user account data for the plurality of unique online content sources. The method also includes requesting, over a network, content availability data from the plurality of unique online content sources based at least in part on the selection of media content and the user account data. The content availability data indicates whether the selection of media content is available to a user account in the user account data. The method additionally includes receiving, at the processing circuit, the content availability data. The method further includes using the content availability data to generate a notification for an electronic device. The notification indicates that the selection of media content is available to at least one user account in the user account data from at least one of the plurality of unique online content sources.

Another implementation is a processing circuit configured to generate a media content availability notification. The processing circuit is further configured to receive a selection of media content and content delivery preferences. The content delivery preferences include a selection of a plurality of unique online content sources and user account data for the plurality of unique online content sources. The processing circuit is also configured to request, over a network, content availability data from the plurality of unique online content sources based at least in part on the selection of media content and the user account data. The content availability data indicates whether the selection of media content is available to a user account in the user account data. The processing circuit is further configured to receive the content availability data from the plurality of unique online content sources. The processing circuit is additionally configured to use the content availability data to generate a notification for an electronic device. The notification indicates that the selection of media content is available to at least one user account in the user account data from at least one of the plurality of unique online content sources.

A further implementation is one or more computer-readable media having instructions therein. The instructions are executable by one or more processors to execute a method. The method includes receiving, at the one or more processors, a selection of media content and content delivery preferences. The content delivery preferences include a selection of a plurality of unique online content sources and user account data for the plurality of unique online content sources. The method also includes requesting, over a network, content availability data from the plurality of unique online content sources based at least in part on the selection of media content and the user account data. The content availability data indicates whether the selection of media content is available to a user account in the user account data. The method further includes receiving, at the one or more processors, the content availability data. The method additionally includes using the content availability data to generate a notification for an electronic device. The notification indicates that the selection of media content is available to at least one user account in the user account data from at least one of the plurality of unique online content sources.

These implementations are mentioned not to limit or define the scope of this disclosure, but to provide examples of implementations to aid in understanding thereof. Particular implementations can be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

DETAILED DESCRIPTION

According to some aspects of the present disclosure, notifications regarding the availability of media content from different content sources can be generated based on user preferences. In this way, media content may be "bookmarked" for future availability. Examples of user preferences include preferences that allow the user to specify which content sources to search, whether to also search for related content (e.g., a single TV episode vs. an entire series, a book or video game related to a piece of content, etc.), and the format of the content (e.g., broadcast television, online streaming, DVD, etc.). User authorizations to access various content sources can be stored in the system (client and/or server side) and used to search only those content sources to which the user has access. Pricing information can also be used to further tailor the notifications. For example, a user can opt to be notified when a movie becomes available from a free source, from a free source with advertisements, from a pay service to which the user subscribes, and/or when the cost to view the content is below a certain price threshold.

Figure 1:
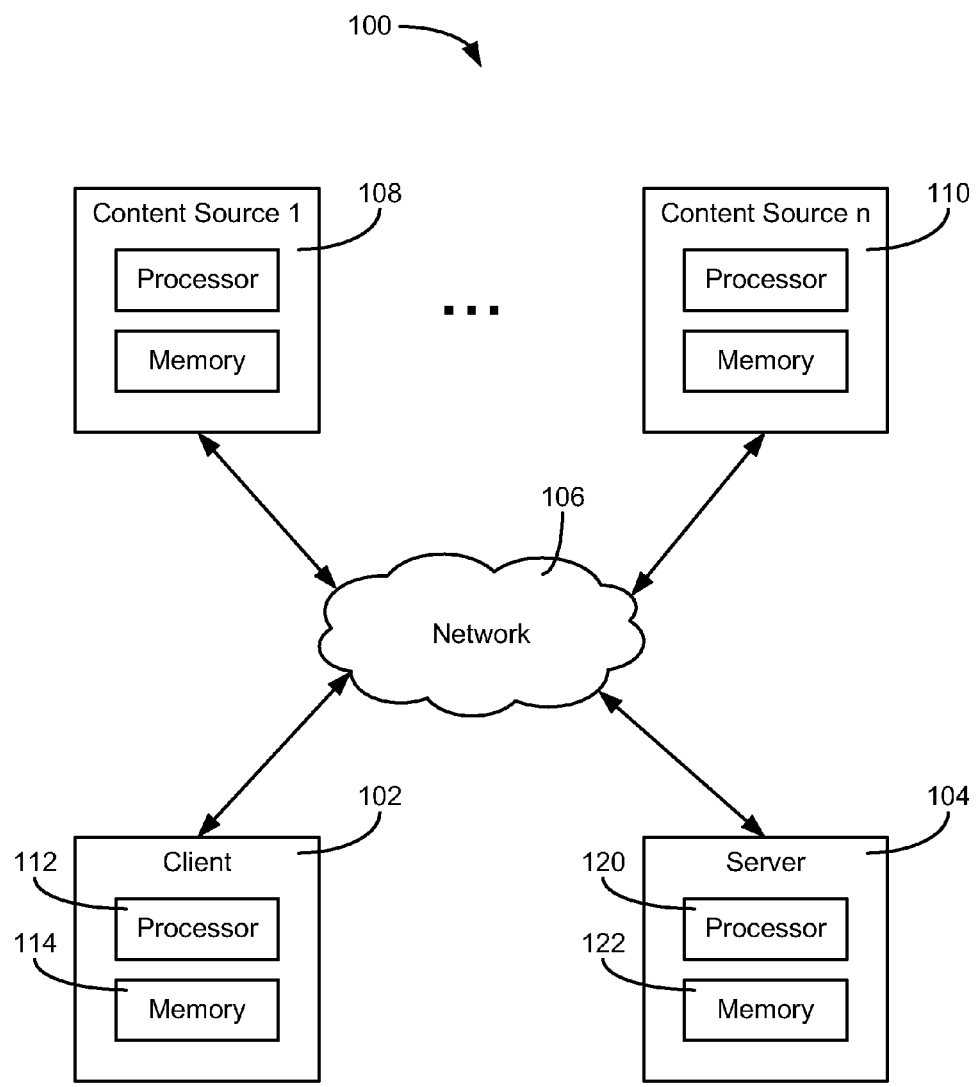
FIG. 1 is a block diagram of a computer system in accordance with a described implementation.

Referring to FIG. 1, a block diagram of a computer system in accordance with a described implementation is shown. System 100 is shown to include client 102 which communicates with server 104 via network 106. System 100 also includes a plurality of content sources ranging from a first content source 108 up to an nth content source 110. Client 102 and/or server 104 also communicate with content sources 108, 110 via network 106.

Network 106 may be any form of computer network that relays information between client 102, server 104, and content sources 108, 110. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radar, etc.) with a transceiver that is hardwired (e.g., via a fiber optic cable, a CAT5 cable, etc.) to other computing devices in network 106.

Client 102 may be any number of different user electronic devices configured to communicate via network 106 (e.g., a laptop computer, a desktop computer, a tablet computer, a smartphone, a digital video recorder, a set-top box for a television, a video game console, etc.). Client 102 is shown to include processor 112 and memory 114. Memory 114 stores machine instructions that, when executed by processor 112, cause processor 112 to implement one or more of the methods described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may further include a floppy disk, CD-ROM, DVD, magnetic disk, memory chip, ASIC, FPGA, ROM, RAM, EEPROM, EPROM, flash memory, optical media, or any other suitable memory from which processor 112 can read instructions. The instructions may include code from any suitable computer-programming language, such as, but not limited to, C, C++, C#, Java, JavaScript, Perl, Python and Visual Basic.

Client 102 may also include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client 102 (e.g., a built-in display, microphone, etc.) or external to the housing of client 102 (e.g., a monitor connected to client 102, a speaker connected to client 102, etc.), according to various implementations.

Content sources 108, 110 are also electronic devices connected to network 106 and provide media content to client 102. For example, content sources 108, 110 may be computer servers (e.g., FTP servers, file sharing servers, web servers, etc.) or other devices that provide media content to client 102 via network 106. In some cases, content sources 108, 110 may not provide media content via network 106, but provide information about the availability of other media formats. For example, a content source may provide a movie schedule, a television schedule, an electronic programming guide, availability information regarding a physical media format (e.g., a DVD, a Blu-Ray, a VHS tape, etc.), or other availability data to server 104. In some implementations, one or more content sources may utilize authorizations (e.g., user accounts, passwords, encryption keys, etc.) to restrict access to media content. For example, content source 108 may require a paid subscription to access its media content, while content source 110 may charge for an individual piece of content. In some implementations, content sources 108, 110 may also include search functions that allow client 102, server 104, and/or other devices on network 106 to query the availability of media content. For example, client 102 may send a search request to content source 108 for a particular movie. In response, content source 108 may provide data back to client 102 indicative of whether or not the content is available, whether or not a particular user account is authorized to access the content, pricing information, and other relevant information.

Server 104 may be one or more computing devices on network 106 that facilitate the searching of content sources 108, 110 for media content. In some implementations, server 104 may provide one or more interfaces (e.g., displayed webpages, etc.) to an interface device of client 102. For example, client 102 may store a web browser that can receive web pages from server 104 to search for media content accessibility. In other implementations, the search interfaces may be local to client 102 (e.g., an application, program, script, etc., that is running on client 102) and updated using information from server 104 (e.g., by making API calls, SQL queries, etc.). For example, client 102 may store a media player or other application in memory 114 that allows a user to access media content, when executed. The media player application may also include the ability to send search queries to server 104 for media content availability.

Server 104 aggregates media content availability information from content sources 108, 110, in response to receiving a selection of media content from client 102. In some implementations, server 104 may use the received selection to generate and send search queries to content sources 108, 110 for the availability of the content. For example, client 102 may receive a selection of a particular movie from an interface device and request content availability information from server 104. In response to receiving the request, server 104 may generate corresponding search requests for availability information from content sources 108, 110. Server 104 may then send one or more notifications back to client 102 that report the results of the searches of content server 108, 110.

Notifications may include any form of electronic notification for a user electronic device. For example, a notification may include text or other visual indicia for display by client 102, one or more sounds generated by a speaker of client 102, and other ways of conveying information to a user via client 102. Notification formats may include, in various implementations, an email, a notification within a running application (e.g., a popup window, a notification icon, etc.), a text message to a mobile device, a web feed or stream (e.g., an RSS feed, etc.), a notification via a social networking account, and other forms of notifications for notifying a user via an electronic device about the availability of media content. In other implementations, a notification may be a webpage that displays the availability of requested media content or an annotation on a detail screen (e.g., providing details about the media content) that highlights availability.

Figure 2A:
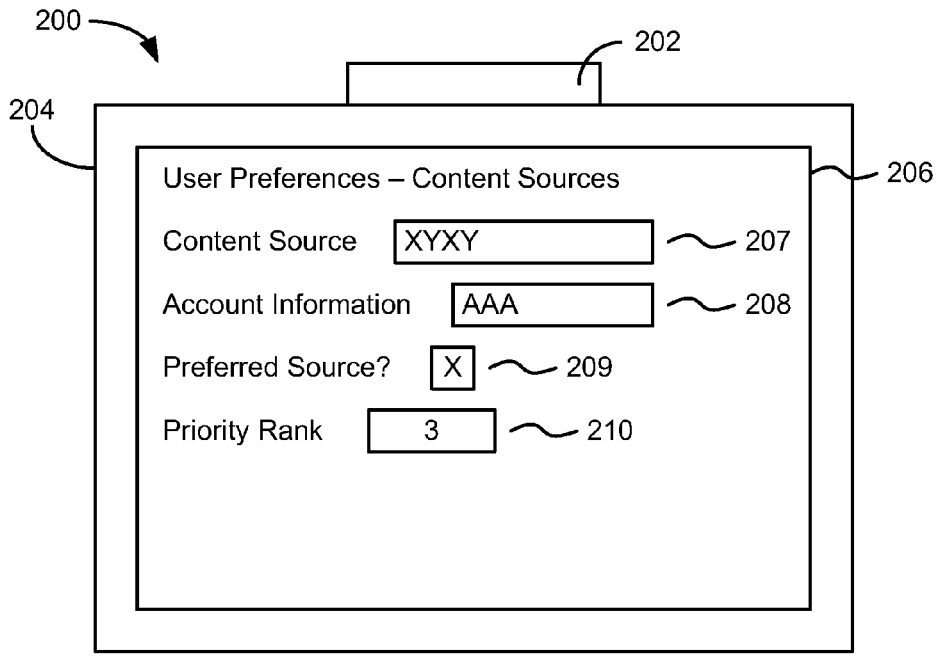
FIG. 2A is an illustration of a system for searching media content, according to one example.

Referring now to FIG. 2A, a system for searching media content is shown, according to one example. System 200 includes media receiver 202 and display 204 (e.g., a television set, a monitor, etc.). According to various implementations, media receiver 202 and display 204 may share the same housing or may be separate devices that communicate electronically with one another (such as in a case where media receiver is embodied as a set-top box). For example, display 204 may be a television set that integrates the processing electronics of media receiver 202. In other implementations, system 200 may be a mobile device, a computer, or other user electronic device that includes a display coupled to a processing circuit and performs the functions of media receiver 202 described herein. Media receiver 202 may comprise any type of media processing device, such as an internet video streaming receiver box, a "Smart T.V.", a companion device, a web/t.v. integration device, a media player such as a Blu-Ray player or DVD player, a cable or satellite TV receiver, or other media receiver.

Set-top box 202 receives media content from content providers via a network (e.g., the Internet, a VPN, a WAN, etc.) and provides the media content to a user via display 204. For example, display 204 may be configured to play video and/or audio received via set-top box 202. Set-top box 202 is also configured to transmit data (e.g., account information such as log-in credentials, search requests, etc.) to the content providers, in order to access the media content. Set-top box 202 may include, for example, one or more applications that allow a user to define which content sources are to be accessed by set-top box 202.

In some implementations, an application running on set-top box 202 may provide one or more configuration screens that allow a user to configure the content sources to be accessed by set-top box 202. For example, configuration screen 206 may be presented by set-top box 202 to display 204. Configuration screen 206 may include any number of different mechanisms for receiving input related to accessing a content source. For example, configuration screen 206 may include one or more check boxes, text fields, drop-down menus, icons, selectable graphics, and other mechanisms for receiving input from an interface device of display 204 (e.g., from a pointing device, a keypad, a touchscreen, etc.). Data relating to accessing a content source may include, for example, the name of the content source, an address for the content source on the network, account information for the content source, whether the content source is a preferred source, or a priority rank for the content source.

As shown, configuration screen 206 includes input 207 for receiving an identifier of the content source. For example, input 207 may receive an identifier of the name of the content source and/or an address for the content source on the network (e.g., a web address, an IP address, or other unique identifier). In some implementations, input 207 may be a dropdown box or other input field that allows a user to select the name of the content source. In such a case, the address of the content source may be associated with the selected name, thereby saving the user from having to enter the address. In other implementations, input 207 may include multiple fields for input of the name of the content provider, as well as the address of the content provider.

Configuration screen 206 also includes input 208 for receiving account information for the content source (e.g., a login identifier, a password, a digital certificate, etc.). If the content source entered in input 207 accepts user account information, the account information may be entered into input 208 and used by set-top box 202 to access the content source. Depending on the content source, account information may or may not be required. For example, a content source may provide a free service that does not require an account and a restricted service that requires an account to access certain content (e.g., paid content, content restricted to certain age groups, etc.). In another example, a content source may require an account to access any content that it provides. In further implementations, set-top box 202 may include a separate application that is specific to the content source and used to access the content source (e.g., the content source has its own application on set-top box 202). In such cases, the account information may be stored via that application and configuration screen 206 may be used to create a configuration that launches the content source-specific application when set-top box 202 accesses the content source.

Configuration screen 206 may also include inputs 209 and 210 for configuring the order in which content sources are accessed for a particular piece of media content. For example, input 209 may be used to receive an indication that the content source is a preferred source. If desired media content is available from multiple sources, an indication that a particular content source is a preferred source may be used to select which content sources are accessed first. For example, if a particular movie is available from both a preferred source and a non-preferred source, set-top box 202 may retrieve the movie from the preferred content source. Similarly, configuration screen 206 may include input 210 for receiving an indication of a priority rank. A priority rank may be used by set-top box 202 to further determine which content source is to be accessed, if a particular piece of media content is available from multiple sources. For example, even among preferred sources, the user may have a preference as to which content source should be accessed first. In such a case, the priority rank received via input 210 may be used to select which content source is actually accessed for the media content. In some implementations, a content source may include other applications on set-top box 202. For example, a particular piece of media content may also be available in another application (e.g., a media player, etc.) in set-top box 202.

In some implementations, set-top box 202 is also in communication with a server that facilitates searching the content sources for content availability information. In such a case, the configuration data entered via configuration screen 206 may be stored in the memory of set-top box 202, in the memory of the search server, or both. For example, configuration screen 206 may be part of a web page provided by the search server and stored on the server. In another example, configuration screen 206 may be part of a media player or other application running on set-top box 202. In such a case, the configuration data may then be sent to the search server for storage and/or stored within the memory of set-top box 202 itself.

The configuration information entered via configuration screen 206 may be used by the search server to search for media content. For example, system 200 may be configured to search three different content sources based on information entered via configuration screen 206. When a user selects to search for a particular piece of media content, the search server may utilize the configuration information received via configuration screen 206 to determine which content sources are to be searched, whether account information is also to be used for the search, and the order in which the content sources are to be searched.

Figure 2B:
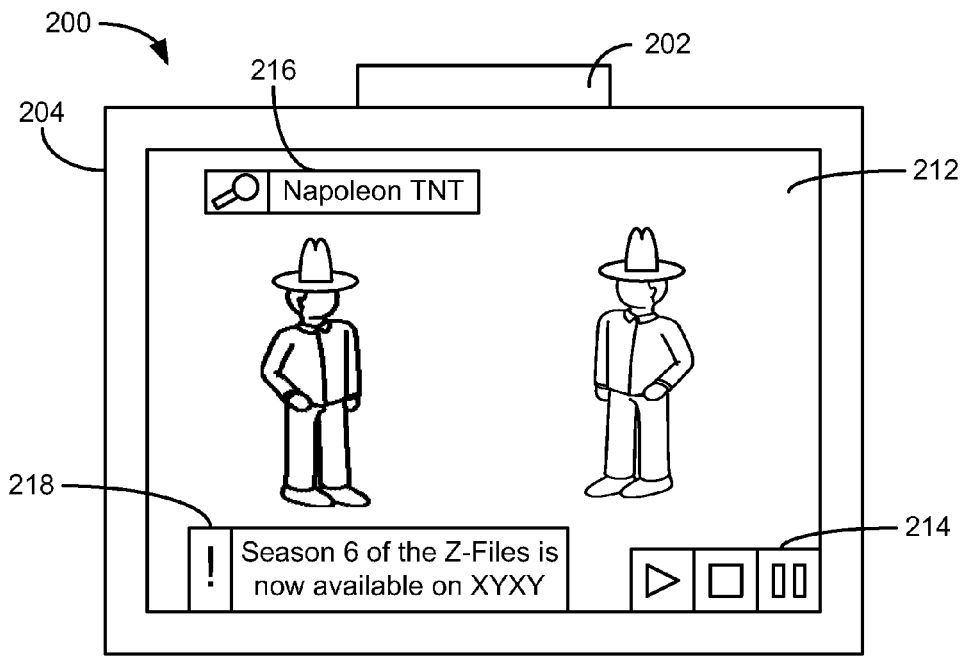
FIG. 2B is an illustration of an application displayed by the system in FIG. 2A, according to another example.

Referring now to FIG. 2B, a displayed application is shown, according to one example. As shown, set-top box 202 may provide application screen 212 to display 204. For example, application screen 212 may be provided by a media player that processes media content to produce audio and/or video via display 204 or a speaker. In such a case, application screen 212 may also include a number of controls 214 that allow a selection of how the media content is processed (e.g., inputs that control functions such as play, stop, pause, fast forward, rewind, etc.). The media player that provides application screen 212 may be a stand-alone application or embedded into a web page, according to various implementations. In further implementations, the media player may include digital video recording (DVR) functions, thereby allowing media content to be stored in the memory of set-top box 202 for future use.

Search input 216 may also be provided by set-top box 202 to display 204. In one implementation, search input 216 may be part of the same application that provides application screen 212. For example, search input 216 may be provided by a media player that provides application screen 212 to display 204. In another implementation, search input 216 may be part of a separate application. For example, search input 216 may be overlaid on top of application screen 212 by another application or provided on a separate display screen entirely. In further implementations, search input 216 may be part of a web page provided by the search server to set-top box 202.

Set-top box 202 uses search information received via search input 216 to search for media content. Search information may include, for example, a title of the media content, a name of a person associated with the media content (e.g., an actor, a musician, a director, etc.), or any other information that may be used to search for media content. In one implementation, set-top box 202 may send the search information to a remote search server that facilitates the search. The remote search server may use the search information to identify a particular piece of media content and to query the availability of the media content from a plurality of content sources.

Notification 218 may also be provided by set-top box 202 to display 204. Notification 218 provides an indication to display 204 that a particular piece of media content is available. For example, notification 218 may provide an indication of the name of the media content, the content source from which the media content is available, pricing information, and other information relating to the availability of the media content. As shown, notification 218 is provided by the same application that provides search input 216 to display 204 (e.g., as part of a media player, overlaid on top of a media player application, etc.). In various implementations, notification 218 may be an email, a notification within a running application (e.g., a popup window, a notification icon, etc.), a text message to a mobile device, a web feed or stream (e.g., an RSS feed, etc.), a notification via a social networking account, or any other form of notification provided by an electronic device.

Notification 218 may be generated, for example, in response to set-top box 202 receiving a search query via search input 216. For example, notification 218 may be generated when the media content associated with the search query becomes available at a content source. A particular set of content sources to be searched may be identified by a user via configuration screen 206. In some implementations, notification 218 may also perform other functions when selected. For example, selection of notification 218 may play the media content immediately or cause the media content to be stored for later viewing (e.g., recorded by a DVR, etc.).

In some implementations, notification 218 may be provided without first receiving an associated search query from search input 216. For example, notification 218 may be generated automatically by the search server as a suggestion to the user. In such a case, the search server may utilize information regarding previously retrieved media content, user ratings of previously retrieved media content, playlist or channel subscriptions, media content in a user's queue, saved DVR content, information regarding a friend's activity (e.g., a friend suggesting media content via a social network site, a friend sending a suggestion to the user, etc.), and other user information to predict media content that may be relevant to a user.

Figure 2C:
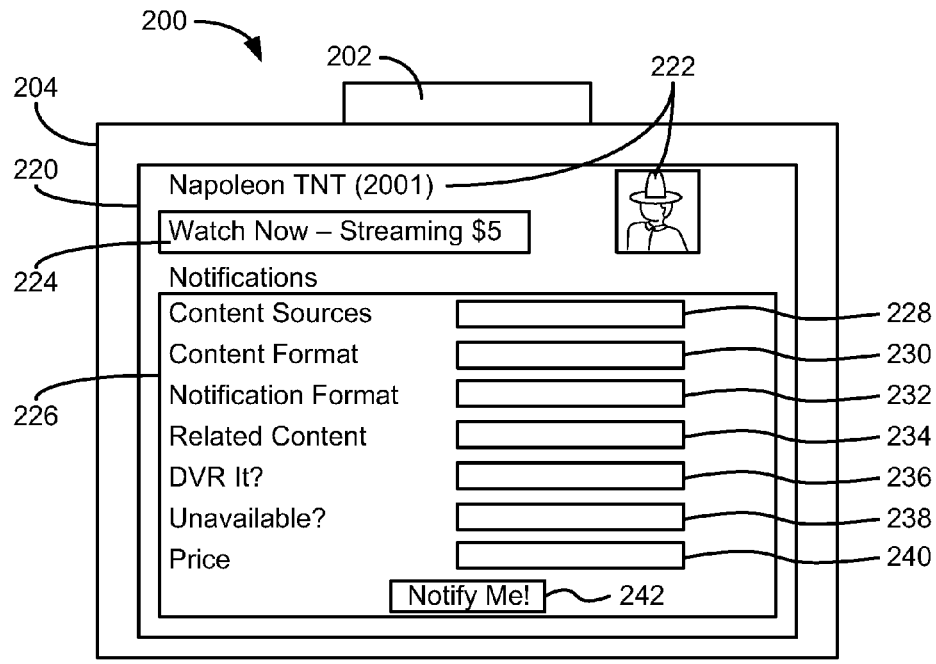
FIG. 2C is an illustration of a search result screen displayed by the system in FIG. 2A, according to another example.

Referring now to FIG. 2C, a search result screen is shown, according to one example. Search result screen 220 may be provided by set-top box 202 to display 204 in response to receiving a search request via search input 216. In one implementation, search result screen 220 includes general information 222 about the media content that is retrieved by the search server. For example, general information 222 may include the title of the media content, the date the media content was first published, one or more pictures associated with the media content (e.g., a still frame from a movie, the cover of a music album, etc.), information regarding people associated with the media content (e.g., an actor, a singer, a director, a producer, etc.), and other general information that identifies the media content.

Search result screen 220 may also include availability information 224 that is retrieved by the search server. The availability information may be, for example, an indication that the media content is available now from a particular content source, scheduling information relating to when the media content is available from a particular content source, as well as other information about potential delivery of the media content (e.g., the format of the media content, a price associated with receiving the media content, etc.) to set-top box 202 or another electronic device. In some implementations, availability information 224 may include a set of content sources from which the desired media content is available. For example, availability information 224 may include a list or partial list of content sources that are accessible by the user. The list or partial list may be sorted or restricted based on user preferences for the content sources. For example, availability information 224 may show a list of preferred content sources that is sorted by priority rank.

Search result screen 220 may also include notification configuration screen 226. Notification configuration screen 226 may be used to configure how and when availability notifications are to be generated. In some implementations, notification configuration screen 226 may be provided in conjunction with search result screen 220 (e.g., as an embedded subscreen of search result screen 220, as a popup window, search result screen 220 can be navigated to reach notification configuration screen 226, etc.). In this way, notification configuration subscreen can be used to configure notification for the particular piece or type of media content that was searched. In other implementations, notification configuration screen 226 may be provided to configure notification preferences at the content source level or at the global level. For example, notification configuration screen 226 may be generated in conjunction with content source configuration screen 206 to configure how notifications are generated when content is available from a particular content source. In some implementations, configuration settings may be applied at the content level (e.g., for a particular series, movie, etc.). In another example, notification configuration screen 226 may be used to allow configuration of notifications for all media content available at any content source, i.e., in a global manner.

Notification configuration screen 226 may include content source input 228. Content source input 228 receives a selection of one or more content sources for which content availability information is to be provided. According to various examples, content source input 228 may be a list, set of icons, check boxes, text fields, or other forms of input that can be used to receive a selection of one or more content sources. For example, a user may wish to be notified when a particular piece of media content is available only from certain content sources.

Notification configuration screen 226 may also include content format input 230. Content format input 230 receives a indication of one or more ways in which the media content may be presented. Content format information may include information relating to the quality of the media content (e.g., high-definition, high-fidelity, standard-definition, etc.), or a resolution. Content format information may also include information regarding how the media content is conveyed (e.g., via streaming, on television, on physical media, video-on-demand, etc.). Content information may further include information relating to which devices can receive the media content (e.g., a television set, a mobile device, a computer screen, etc.). Content information may additionally include information relating to the level of authorization associated with the user. For example, content format information may include whether the media content is available for free to the user, available for free with advertisements, available on a pay-per-view basis, available for purchase, available via a subscription service that has not yet been activated, available by redeeming reward points, available only during a certain time period, available only to certain geographic locations, or other ways to distinguish the format of the media content.

Notification configurations screen 226 may also include notification format input 232. Notification format input 232 receives one or more indications of how the user wishes to be notified. Notification format information may include an indication of which devices at which the user wishes to receive the notification (e.g., set-top box 202, a mobile device, a computer, an IP phone, etc.). Notification format information may also include how the user wishes to receive the notification (e.g., as an email, a text message, as a pop-up, as an in-application notification, as an audio notification, as an overlay to a web page over media being viewed, etc.) and when (e.g., a specified time before the content becomes available, when the content is actually available, etc.). Notification format information may further include an indication of a level of importance for the notification. For example, a notification may be sent at a higher priority (which may entail highlighting, a special color, an audio cue along with a visual cue, etc.) if the media content becomes available at a preferred content source.

Notification configuration screen 226 may also include related content input 234. Related content input 234 receives one or more indications of types of related media content for which the user wishes to receive an availability notification. For example, related media content for an episode of a television show may be other episodes of the show (e.g., previously aired episodes or episodes that have not yet aired), an entire season of the show, or the entire series of the show. In such a case, the user may elect via related content input 234 to be notified whenever a new episode airs, whenever a rerun airs, when one or more specified episodes become available, when one or more specified seasons become available, or when the entire series becomes available. Related media content may also include movies, trailers, clips, music, books, games, and other content that is associated with a particular piece of media content. For example, a user searching for a particular television show may elect via related content input 234 to receive notifications when the television show is made into a movie or video game, or when a new version of such a game is released or due to be released.

Notification screen 226 may further include a DVR input 236. DVR input 236 may be used by set-top box 202 and/or the remote server to automatically record media content when it becomes available. For example, a user may utilize DVR input 236 to automatically record new episodes of a particular television show when they become available. In some implementations, DVR input 236 may be part of the notification itself. For example, a user that receives a notification that a new episode of a television show is about to air may utilize DVR input 236 to record the episode. In other implementations, DVR input 236 may be part of notification configuration screen 226, allowing the user to specify that the episode should be recorded, whenever possible.

Notification configuration screen 226 may additionally include expiration input 238. In some cases, availability information for a particular piece of media content may also include information relating to when the media content will no longer be available from a content source or available in a certain format. For example, an episode of a television show may only be available for free with advertisements via streaming from a content source during the two weeks after the episode airs on television. A user wishing to be notified when media content will no longer be available may provide an indication via expiration input 238. In some implementations, the indication may also include when the notification is to be generated. For example, a user may provide an indication via expiration input 238 that a notification is to be sent a day before the content becomes unavailable, or at any other time.

Notification configuration screen 226 may further include price input 240. Price input 240 receives an indication of one or more threshold prices to receive the media content. The threshold prices are used to control when notifications are generated relative to the price. For example, a user may specify via price input 240 to only receive a notification when the media content is available for purchase below a price threshold or available on a pay-per-view basis below another price threshold. In some implementations, stored user account information may be used as part of the determination as to whether the media content is available below the price threshold. For example, a user may subscribe to a video streaming service that allows the user to view a limited or unlimited number of movies as part of their subscription. Although the user may pay for the service, the user may be able to view the movie at no additional cost. In this case, the actual price to receive the media content may be adjusted to account for a user's access to the content, prior to comparison to a price threshold.

Notification configuration screen 226 may also include save button 242, in some implementations. Save button 242 allows the user to save the notification configuration information inputted via notification configuration screen 226. The notification information may be stored, for example, in the memory of set-top box 202, in the memory of the search server, or in both memories. In some implementations, the stored notification information may be recalled and used to regenerate notification configuration screen 226, to allow the user to make changes to the information. For example, a user may later decide to only receive notifications when new episodes of a television show become available, instead of notifications that also include reruns. In another example, the user may later opt not to receive notifications on a mobile device.

Figure 3:
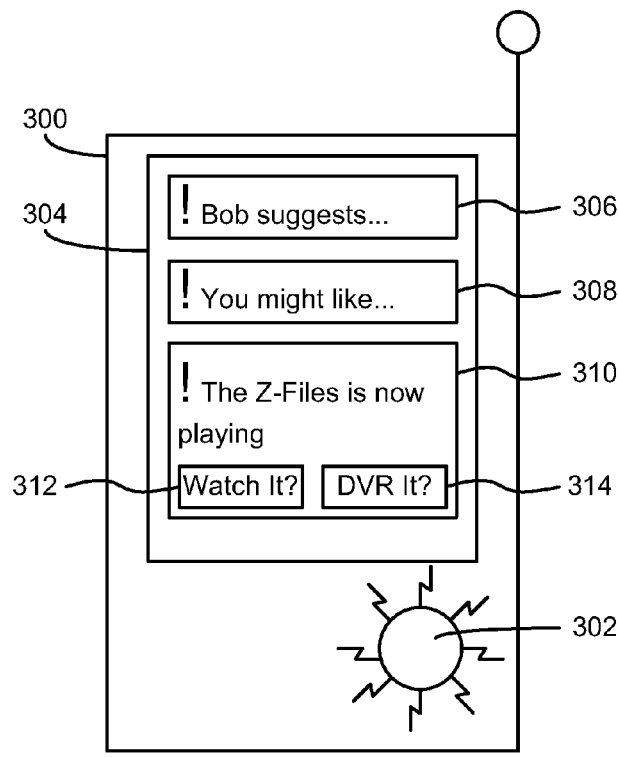
FIG. 3 is an illustration of a mobile device, according to one implementation.

Referring now to FIG. 3, various notifications displayed on a mobile device are shown, according to another example. As shown, mobile device 300 includes audio device 302 (e.g., one or more speakers, buzzers, microphones, etc.) and display 304 (e.g., one or more LCD displays, one or more touch screen displays, etc.). Mobile device 300 may be, for example, a cellular telephone, a laptop computer, a personal digital assistant, a tablet computer, a music player, or other portable electronic device. Notifications may be provided by mobile device 300 via display 304 and/or audio device 302. For example, a notification may be a sound produced by audio device 302 in combination with displayed indicia provided by display 304. Mobile device 300 may receive the notifications from a search server, such as server 104 shown in FIG. 1.

Suggestion notification 306 may be provided by display 304 of mobile device 300. For example, suggestion notification 306 may be provided to mobile device 300 in response to a friend, relative, acquaintance, or other user suggesting media content to the user of mobile device 300. In various implementations, a second user may utilize a social media site or other application to suggest that the user of mobile device 300 receive the media content. For example, a friend of the user of mobile device 300 may like a movie and suggest that the user of mobile device 300 also watch the movie. Suggestion notification 306 may include, for example, indicia of the suggested media content, as well as an indication of the user that suggested the media content.

Suggestion notification 308 may also be provided by display 304. Similar to suggestion notification 306, suggestion notification 308 may be generated regarding media content for which the user of mobile device 300 did not specifically request a notification. However, suggestion notification 308 may be generated automatically based on a number of factors, such as previously retrieved media content, ratings of previously retrieved media content by the user of mobile device 300, playlist or channel subscriptions, media content in a queue, saved DVR content, demographic information, and other information that can be used to predict media content that may be relevant to the user of mobile device 300. In some implementations, suggestion notification 308 may appear differently than that of suggestion notification 306. For example, suggestion notification 308 may include different icons, text, or other indicia that indicate the suggestion notification 308 relates to media content that was automatically suggested by the search server, instead of by another user.

Notification 310 may additionally be provided by display 304 of mobile device 300. Notification 310 is generated in response to a request for availability information initiated by the user of mobile device 300, as opposed to suggested media content. For example, the user of mobile device 300 may utilize notification configuration screen 226 in FIG. 2C or another input screen to specify for which media content notification 310 is to be generated. In another example, the user of mobile device 300 may opt to receive notifications whenever a particular movie becomes available for free.

Notifications 306, 308, and 310 may also include inputs for one or more follow-up actions. For example, notification 310 is shown to include inputs 312 and 314. In response to receiving an indication from input 312, mobile device 300 may access the media content associated with notification 310 and begin playing it. In some implementations, selection of notification 310 itself may begin playing the media content. In response to receiving an indication from input 314, the media content associated with notification 310 may be recorded for future access. For example, the search server, a set-top box associated with mobile device 300, or mobile device 300 itself may include a DVR that records the media content associated with notification 310. In various implementations, inputs 312 and 314 may be included in some or all of the different types of notifications.

Figure 4:
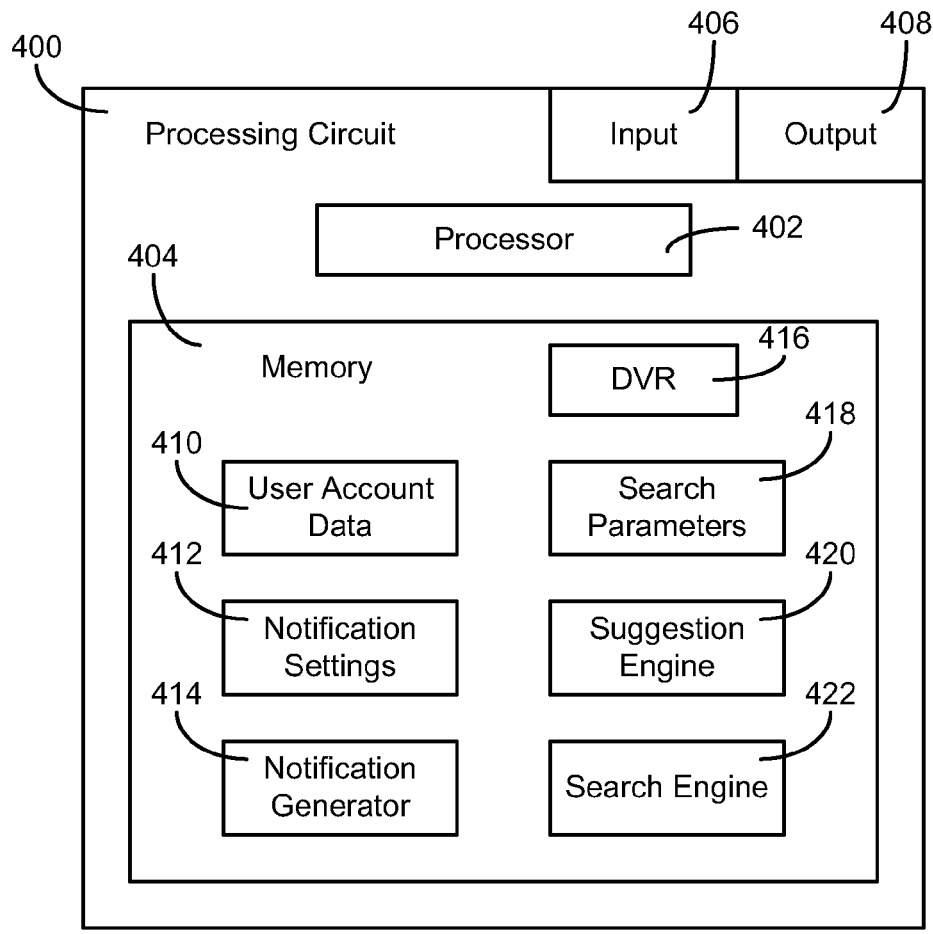
FIG. 4 is a schematic block diagram of a processing circuit configured to search for media content.

Referring to FIG. 4, a detailed block diagram of processing circuit 400 is shown, according to one implementation. Processing circuit 400 may be a component of a search server (e.g., server 104 in FIG. 1 or another server) or another electronic device that facilitates searching for media content availability data. Processing circuit 400 includes processor 402 and memory 404. Processor 402 may be or include one or more microprocessors, an application specific integrated circuit (ASIC), a circuit containing one or more processing components, a group of distributed processing components, circuitry for supporting a microprocessor, or other hardware configured for processing data. Processor 402 is also configured to execute computer code stored in memory 404 to complete and facilitate the activities described herein. Memory 404 can be any volatile or non-volatile computer-readable medium capable of storing data or computer code relating to the activities described herein. For example, memory 404 is shown to include DVR 416, notification generator 414, suggestion engine 420, and search engine 422, which may be implemented using computer code (e.g., executable code, object code, source code, script code, machine code, etc.) configured for execution by processor 402. When executed by processor 402, processing circuit 400 is configured to complete the activities described herein.

Processing circuit 400 also includes hardware circuitry for supporting the execution of the computer code DVR 416, notification generator 414, suggestion engine 420, and search engine 422. For example, processing circuit 400 includes hardware interfaces (e.g., output 408) for communicating media content search requests to a plurality of content sources via a network. Output 408 may also provide content search results (e.g., from search engine 422), stored media content (e.g., from DVR 416), and notifications (e.g., from notification generator 414) to one or more user electronic devices (e.g., a set-top box, a mobile device, a computer, etc.). Processing circuit 400 may also include an input 406 for receiving, for example, user account data 410, notification settings 412, and/or search parameters 418 from one or more user electronic devices.

User account data 410 may be received via input 406 from one or more user electronic devices and stored in memory 404. User account data 410 may be utilized by processing circuit 400, for example, to identify a particular user across a plurality of user electronic devices. For example, user account data 410 may include account data for a particular user that has a mobile device (e.g., mobile device 300 or another mobile device), a set-top box (e.g., set-top box 202), and other user electronic devices.

In some implementations, user account data 410 may also include configuration settings regarding one or more content sources. For example, user account data 410 may include a set of content sources from which media content may be provided for a particular user. In some implementations, the content sources identified in user account data 410 may also include information relating to a particular user's level of access to the content source and/or security data (e.g., login name, password, etc.) for the content source. Other examples of data relating to a content source for a particular user may include a priority rank for the content source, whether the content source is a preferred source for the user, and other information relating to content sources that may be associated with a particular user account.

Notification settings 412 may be also be received via input 406 from one or more user electronic devices and stored in memory 404. In general, notification settings 412 include one or more parameters that control the operation of notification generator 414. Notification settings 412 may include global settings (e.g., settings that apply to all notifications), settings specific to a particular content source, or settings specific to a particular type of media content. Notification settings 412 may include, for example, an identification of a particular piece of media content, which content sources are to be searched for the media content, the content format (e.g., how the media content is presented), the notification format (e.g., how the notification is generated), whether notifications for related content are also to be generated, the types of related content for which notifications are to be generated, whether DVR 416 is to record the media content when it becomes available, whether a notification is to be generated when the media content is going to become unavailable, one or more price thresholds, whether suggestion notifications may be generated, and other settings that may be used by notification generator 414 to control when and how notifications are generated.

Memory 404 may also include search parameters 418, which are used to control when and how search engine 422 performs searches. For example, processing circuit 400 may receive a search request for a particular piece or type of media content from a user electronic device via input 406. If processing circuit 400 also receives a request for related content, search parameters 418 may also include identification information for the related content. For example, if a search request includes a request for a particular television show and for all related content, search parameters 418 may also include a set of related media content to search (e.g., movies, books, video games, etc.). Search parameters 418 may also include one or parameters that control the timing of the searches by search engine 422 (e.g., the media content is to be searched only once, the media content is to be searched periodically, search parameters 418 are to be stored so that they can be used to rerun a search later on when requested by a user, etc.). In further implementations, search parameters 418 may include a playlist of content or an entire channel for which searches are to be performed.

Memory 404 may include DVR 416, according to some implementations. DVR 416 may be configured to store video files, audio files, picture files, and other media content for later use. DVR 416 accesses the media content from a media source by sending a request for the media content via output 408 and receiving the media content in response via input 406. DVR 416 also provides the stored media content to a user electronic device via output 408, in response to receiving a request for the stored media content. In some implementations, DVR 416 may record media content associated with a notification either automatically or in response to a manual selection. For example, notification settings 412 may include a parameter that specifies that DVR 416 is to automatically record media content associated with a generated notification, when the associated media content becomes available. In another example, a user reviewing a notification may provide an indication that the associated media content is to be recorded by DVR 416. In other implementations, DVR 416 may be located in a user electronic device. In such a case, processing circuit 400 may provide a command to DVR 416 to record content.

Memory 404 may also include suggestion engine 420. Suggestion engine 420 analyzes data that may be used to suggest media content for a particular user. For example, suggestion engine 420 may analyze previously retrieved media content data stored in search parameters 418, ratings of previously retrieved media content stored in user account data 410, playlist or channel subscriptions stored in user account data 410, saved media content in DVR 416, demographic information stored in user account data 410, and other user preferences stored in user account data 410, to predict media content that may be relevant to a user. Suggestion engine 420 may provide indications of suggested media content to search engine 422, to initiate a search for the availability of the media content. In some implementations, suggestion engine 420 may also use data received from another user account or system, to generate suggested media content. For example, data from a second user account in user account data 410 held by a friend, relative, or other acquaintance of the holder of a first user account may be used to suggest media content. In another example, suggestion engine 420 may receive an indication of suggested media content from a user electronic device or from a social network site (e.g., a friend suggests media content to the user, etc.).

Memory 422 may further include search engine 422 configured to search for media content availability data. Search engine 422 may perform a search in response to processing circuit 400 receiving a search request (e.g., search parameters 418) from a user electronic device via input 406. Search engine 422 utilizes user account data 410, notification settings 412, and search parameters 418 to generate a plurality of search requests. Search engine 422 provides the generated search requests to a plurality of content sources via output 408. A search request may include, for example, identification information for the searched media content (e.g., a title, year, genre, person associated with the media content, etc.), format information for the media content, access information for the particular content source (e.g., user account information for the content source, a level of access to the content source, etc.). In some implementations, search engine 422 may limit which content sources are searched and/or the order in which content sources are search based on parameters stored in user account data 410, notification settings 412, and/or search parameters 418.

In some implementations, search engine 422 may be configured to utilize different metadata formats when querying the content sources. For example, one content source may use a metadata format that differs from that of another content source. In such a case, search engine 422 may initiate search requests that conform to the formats used by each of the respective content sources. In addition, search engine 422 may process the returned search results, to aggregate the content availability data into a single format. In one implementation, search engine 422 may map metadata from each content source to a unique identifier used to identify a particular piece of media content. For example, a particular episode of a television show may be associated with a unique identifier. Search engine 422 may map incoming search results to the unique identifier, in order to aggregate and compare availability data from the different content sources for the particular television show. In other implementations, search engine 422 may utilize textual analysis to match structured, unstructured, or semi-structured search results to a standard format. For example, search engine 422 may use textual analysis to extract a movie title and year from the returned search results.

Search engine 422 receives search results via input 406 from the plurality of content sources and aggregates the search results. In some implementations, search engine 422 may receive the search results in response to sending a search request. In other implementations, a content source may send a search result to search engine 422 at a later time (e.g., when the requested content is actually available). Search engine 422 may also filter the search results based on search parameters 418. For example, a content source may not support searching based on pricing information, but provide pricing information in its search results. In such a case, search engine 422 may generate a search request that excludes pricing information and later apply a pricing threshold to the received search results.

Search engine 422 may provide aggregated search results to a requesting user electronic device. For example, search engine 422 may provide additional data about the media content (e.g., title, actors, musicians, directors, a release date, etc.) to the electronic device via output 408. If the media content is available, search engine 422 may also provide an indication of the content sources from which the media content is available. In some implementations, search engine 422 may receive a sitemap or feed from a content source and process the received data to detect changes to media content availability (e.g., when media content is going to become available or unavailable, media content is now available, etc.).

Memory 404 may additionally include notification generator 414. Notification generator 414 provides content availability notifications to user electronic devices via 408. Notification generator uses settings in user account data 410, notification settings 412, and search parameters 418 to determine when notifications are to be generated and how the notifications are to be delivered. For example, notification generator 414 may use a parameter in notification settings 412 to only generate a notification when a new episode of a particular television show becomes available.

Notification generator 414 also provides search requests to search engine 422 to determine content availability. For example, notification settings 412 may indicate that notifications are to be generated by notification generator 414 whenever a movie becomes available via streaming for free with advertisements. Notification generator 414 may provide a search request to search engine 422 to periodically check for the availability of the desired media content in the requested format. Notification generator uses the search returns from search engine 422 to generate notifications in the desired notification format and provides them to user electronic devices via output 408.

In some implementations, notification generator 414 may also provide search requests to search engine 422 in response to receiving a content suggestion from suggestion engine 420. For example, suggestion engine 420 may provide an indication to notification generator 414 that a particular user may like a certain piece of media content. Notification generator 414 may use this indication to generate a search request for search engine 422 and to generate a notification for the user when the suggested media content becomes available.

In further implementations, notification generator 414 may generate different forms of notifications, depending on the initiator of the notification request. For example, if notification generator 414 generates an availability notification based on a request from a primary user, the corresponding notification may have its own format. If notification generator 414 generates a suggestion notification based on a request from suggestion engine 420, the corresponding notification may have a different format. Further demarcation between notification types is also possible. For example, a suggestion notification that was automatically prompted by suggestion engine 420 may have a different format than a suggestion notification that was initiated by a second user (e.g., a second user manually suggests that the first user receive the media content).

Notification generator 414 uses notification settings 412 to determine how the notifications are provided to user electronic devices. In some implementations, notification generator 414 may generate an SMS text message, an email, an in-application notification (e.g., within a media player or other application), as a feed or stream, a web notification, a notification within a social networking account, or any other type of notification. In addition, notification settings 412 may be used by notification generator 414 to determine which user electronic devices associated with user account data 410 are to receive notifications. For example, a parameter in notification settings 412 may specify that notifications are to only be sent to a user's set-top box. In another example, a parameter in notification settings 412 may specify that notifications are to be sent to both a user's set-top box and to the user's mobile phone.

Figure 5:
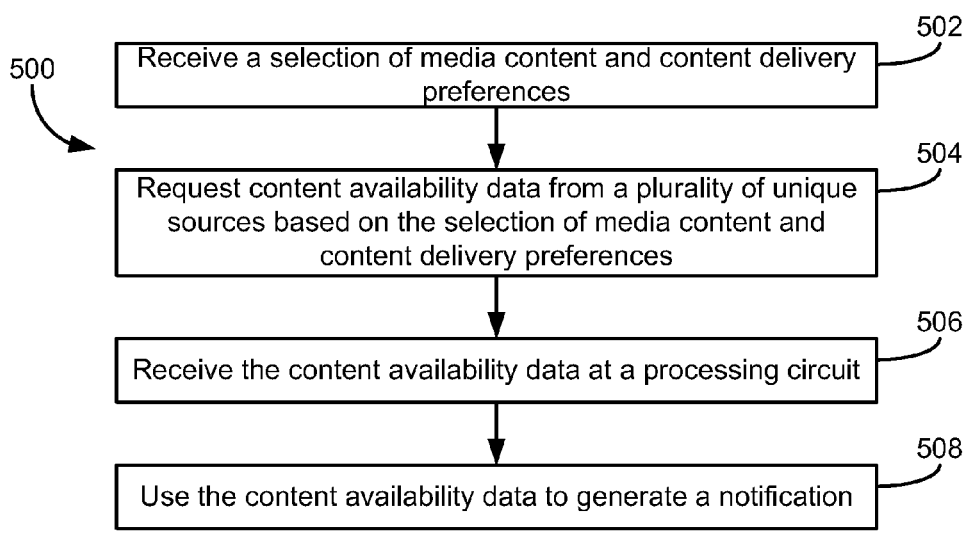
FIG. 5 is a flow diagram of a process for generating a media content availability notification, according to one implementation.

Referring now to FIG. 5, a process for generating a media content availability notification is shown, according to one example. Process 500 includes receiving a selection of media content and content delivery preferences (block 500). The selection of media content and content delivery preference may be received, for example, at a processing circuit configured to search for media content from a plurality of content sources. The selection of media content may include a particular piece of media content (e.g., a television episode, a movie, a song, etc.) or may be a particular type of media content (e.g., part or all of a television series, content that belongs to a playlist or other grouping, media content that belongs to a particular genre, etc.).

The content delivery preferences may include, for example, the format of the media content, how the media content is delivered, the type of device to which the media content is delivered (e.g., a set-top box, a mobile device, etc.), pricing information for the media content, and other preferences. The content delivery preferences may also include a selection of a plurality of unique online content sources (e.g., websites, FTP servers, restricted sources such as those requiring an access key, etc.) and user account data for the plurality of unique online content sources. For example, the content delivery preference may include a website that provides streaming media content and account information for the website that indicates that the user has unlimited streaming.

Process 500 also includes receiving content availability data from a plurality of unique online content sources (i.e., content sources) based on the selection of media content and content delivery preferences (block 504). The request may be sent, for example, over a data network, such as the internet, a cellular network, or any other network that connects the processing circuit to the plurality of unique online content sources. The content availability data may indicate, in some implementations, that the selection of media content is available to a user account in the user account data. For example, if the user account has unlimited streaming on a particular website, and the selected media content is available to the website account, the content availability data may include an indication that the media content is available to a particular user.

In some implementations, the content availability data may also include additional information, such as pricing information and other data relating to media content availability. For example, although a particular piece of media content is available on a pay-per-view basis, the user may wish to know when the media content is available for free or the price is below a specified price threshold. The content availability data may also include pricing and other information that can be used to tailor searches and notification for an individual user.

Process 500 is further shown to include receiving the content availability data at a processing circuit (block 506). The search requests sent to the content sources may be processed by the content sources, which return content availability data to the requesting processing circuit. In some cases, the content availability data may not include all of the criteria specified by the content delivery preferences. For example, a content source may not be able to process all of the criteria of the content delivery preferences in a search request. In such a case, the search request sent to the content source may include only a subset of the content delivery preferences and the received content availability data is further filtered after receipt by the processing circuit.

Process 500 is additionally shown to include using the content availability data to generate a notification (block 508). As media content becomes available or unavailable, notifications may be generated using the content availability data and sent to one or more user electronic devices. In general, the notifications indicate that the media content is available to a particular user. For example, a user may receive a notification when media content becomes available only from content sources at which the user has access. In further implementations, a notification may indicate a change in accessibility data for media content that is already available (e.g., a movie is now available for free instead of via pay-per-view, etc.).

In some cases, the notifications generated in block 508 may also be generated using one or more notification settings. For example, a notification may only be generated when the media content is available in a specific format (e.g., streaming, pay-per-view, free, free with advertisements, etc.), is below a specified price threshold, or available to certain devices (e.g., a set-top box, a mobile device, etc.). The notifications may also be controlled by one or more notification settings. For example, notification settings may include the type of notification (e.g., an email, a text message, a pop-up window in a web browser, etc.), the types of devices to receive the notification (e.g., a mobile phone, a computer, a set-top box, etc.), when notification are to be sent (e.g., one day before the content becomes available or unavailable, once a week, etc.), and other settings that control when and how notifications are generated.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode),TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. For example, while certain implementations are described herein with respect to routing data in a data network, the methodologies described could also be applied to other areas, such as determining the best routes of a map that may be traveled by a person or vehicle. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for generating a media content availability notification comprising:
    receiving, at a processing circuit, a selection of media content and content delivery preferences, wherein the content delivery preferences comprise a selection of a plurality of unique online content sources specified by a user and user account data for each of the plurality of unique online content sources;
    requesting, over a network, content availability data from the plurality of unique online content sources based at least in part on the selection of media content and the user account data, wherein the content availability data indicates whether the selection of media content is available to a user account in the user account data;
    receiving, at the processing circuit, the content availability data; and
    using the content availability data to generate a notification for an electronic device, wherein the notification indicates that the selection of media content is available to at least one user account in the user account data from at least one of the plurality of unique online content sources.

2. The method of claim 1, wherein the content delivery preferences further comprise a price threshold, wherein the content availability data further indicates that a financial cost for at least one user account in the user account data to access the selected media content is below the price threshold, and wherein the notification further indicates that the selection of media content is available below the price threshold.

3. The method of claim 1, wherein the content delivery preferences further comprise a parameter for requesting content available at no additional financial cost to a user account in the user account data, wherein the content availability data further indicates whether the selection of media content is available at no additional financial cost to the user account, and wherein the notification further indicates that the selection of media content is available to the user account at no additional financial cost.

4. The method of claim 3, wherein the notification indicates that the selection of media content is available to the user account at no additional financial cost and contains advertisements.

5. The method of claim 1, further comprising:
    determining, by the processing circuit, related content for the selection of media content;
    requesting, over the network, related content availability data from the plurality of unique online content sources based at least in part on the selection of media content and the user account data, wherein the related content availability data indicates whether the selection of media content is available to a user account in the user account data; and generating a notification when the related content is available to at least one user account in the user account data from at least one of the plurality of unique online content sources.

6. The method of claim 1, further comprising providing a search input field for receiving the selection of media content overlaid on a media player application.

7. The method of claim 1, further comprising receiving an indication of suggested media content from a social networking site, wherein the selection of media content comprises the suggested media content.

8. A processing circuit configured to generate a media content availability notification, wherein the processing circuit is further configured to:

receive a selection of media content and content delivery preferences, wherein the content delivery preferences comprise a selection of a plurality of unique online content sources, a price threshold specified by a user, and user account data for the plurality of unique online content sources;

request, over a network, content availability data from the plurality of unique online content sources based at least in part on the selection of media content and the user account data, wherein the content availability data indicates whether the selection of media content is available to a user account in the user account data at a financial cost for the user account that is at or below the price threshold;

receive the content availability data from the plurality of unique online content sources; and use the content availability data to generate a notification for an electronic device, wherein the notification indicates that the selection of media content is available to at least one user account in the user account data from at least one of the plurality of unique online content sources.

9. The processing circuit of claim 8, wherein the content delivery preferences comprise a selection of the plurality of unique online content sources specified by a user.

10. The processing circuit of claim 8, wherein the content delivery preferences further comprise a parameter for requesting content available at no additional financial cost to a user account in the user account data, wherein the content availability data further indicates whether the selection of media content is available at no additional financial cost to the user account, and wherein the notification further indicates that the selection of media content is available to the user account at no additional financial cost.

11. The processing circuit of claim 10, wherein the notification indicates that the selection of media content is available to the user account at no additional financial cost and contains advertisements.

12. The processing circuit of claim 8, wherein the processing circuit is further configured to:

determine, by the processing circuit, related content for the selection of media content;

request, over the network, related content availability data from the plurality of unique online content sources based at least in part on the selection of media content and the user account data, wherein the related content availability data indicates whether the selection of media content is available to a user account in the user account data; and generate a notification when the related content is available to at least one user account in the user account data from at least one of the plurality of unique online content sources.

13. The processing circuit of claim 8, further comprising providing a search input field for receiving the selection of media content overlaid on a media player application.

14. The processing circuit of claim 8, wherein the processing circuit is further configured to receive an indication of suggested media content from a social networking site, wherein the selection of media content comprises the suggested media content.

15. One or more computer-readable media having instructions therein, the instructions being executable by one or more processors to execute a method comprising:

receiving, at the one or more processors, a selection of media content and content delivery preferences, wherein the content delivery preferences comprise a selection of a plurality of unique online content sources specified by a user and user account data for each of the plurality of unique online content sources;

requesting, over a network, content availability data from the plurality of unique online content sources based at least in part on the selection of media content and the user account data, wherein the content availability data indicates whether the selection of media content is available to a user account in the user account data;

receiving, at the one or more processors, the content availability data; and using the content availability data to generate a notification for an electronic device, wherein the notification indicates that the selection of media content is available to at least one user account in the user account data from at least one of the plurality of unique online content sources.

16. The one or more computer-readable media of claim 15, wherein the content delivery preferences further comprise a price threshold, wherein the content availability data further indicates that a financial cost for at least one user account in the user account data to access the selected media content is below the price threshold, and wherein the notification further indicates that the selection of media content is available below the price threshold.

17. The one or more computer-readable media of claim 15, wherein the content delivery preferences further comprise a parameter for requesting content available at no additional financial cost to a user account in the user account data, wherein the content availability data further indicates whether the selection of media content is available at no additional financial cost to the user account, and wherein the notification further indicates that the selection of media content is available to the user account at no additional financial cost.

18. The one or more computer-readable media of claim 17, wherein the notification indicates that the selection of media content is available to the user account at no additional financial cost and contains advertisements.

19. The one or more computer-readable media of claim 15, wherein the method further comprises providing a search input field for receiving the selection of media content overlaid on a media player application.

20. The or more computer-readable media of claim 15, wherein the method further comprises receiving an indication of suggested media content from a social networking site, wherein the selection of media content comprises the suggested media content.

* * * * *